United States Patent [19]

Chou

[11] Patent Number: 5,142,123
[45] Date of Patent: Aug. 25, 1992

[54] ELECTRIC HEAT SEALER ENERGIZABLE BY INTERNAL BATTERY SET OR EXTERNAL AC ADAPTER

[76] Inventor: Shu-Hui Chou, No. 104, Sec. 2, Hsi-Wan Rd., Hsi-Chi Chen, Taipei Hsien, Taiwan

[21] Appl. No.: 767,598

[22] Filed: Sep. 30, 1991

Related U.S. Application Data

[63] Continuation-in-part of Ser. No. 508,754, Apr. 12, 1990, abandoned.

[51] Int. Cl.⁵ .................... H05B 1/02; B32B 31/20
[52] U.S. Cl. .................... 219/243; 156/515; 156/583.2; 156/583.9; 219/230; 219/240
[58] Field of Search .................. 219/243, 240, 230; 156/515, 583.1, 583.2, 583.8, 583.9

[56] References Cited

U.S. PATENT DOCUMENTS

| | | |
|---|---|---|
| 1,083,386 | 1/1914 | Chapman . |
| 2,443,749 | 6/1948 | Stunkel . |
| 2,465,722 | 3/1949 | Hamilton . |
| 2,535,171 | 12/1950 | Sundstrom . |
| 2,669,642 | 2/1954 | Menges . |
| 2,974,717 | 3/1961 | Lindsay . |
| 3,106,630 | 10/1963 | Klamp . |
| 3,319,047 | 5/1967 | Jones, Jr. et al. ............ 219/388 |
| 3,381,450 | 5/1968 | Monks . |
| 3,408,478 | 10/1968 | Penn ................................ 219/229 |

(List continued on next page.)

FOREIGN PATENT DOCUMENTS 969,962 12/1950 France .
542,359 11/1955 Belgium .

Primary Examiner—Anthony Bartis
Attorney, Agent, or Firm—Varndell Legal Group

[57] ABSTRACT

A housing supports a pair of insulating posts carrying electrical conductors connected a battery set located in the housing. A nonconductive base carries an exposed electric heating wire on the upper surface thereof, opposite ends of the heating wire being connected to electrically conductive side plates connected on the base, a spring biases the base upwardly so that the side plates are normally spaced from the conductors and the upper part of the base carrying the exposed heating wire extends through a hole in a cover supported by the housing. A press bar is pivoted to the housing and can be moved downwardly to engage an object to be sealed supported on the upper part of the base in contact with the exposed heating wire to urge the base downwardly and cause the side plates to engage the conductors and heat the heating wire. Alternately, the conductors can be connected to an external AC power outlet by an adaptor having a step-down transformer and rectifier connected to a plug adapter to be inserted into a power socket on the housing.

3 Claims, 2 Drawing Sheets

U.S. PATENT DOCUMENTS

| | | | |
|---|---|---|---|
| 3,624,349 | 11/1971 | Rolf Mayer | 219/243 |
| 3,624,349 | 11/1971 | Mayer | 219/243 |
| 3,660,959 | 5/1972 | La Fleur . | |
| 3,752,017 | 8/1973 | Lloyd et al. | 219/233 X |
| 3,753,829 | 8/1973 | Freeman | 156/515 X |
| 3,822,164 | 7/1974 | Guido et al. | 156/358 |
| 3,840,722 | 10/1974 | Mayer et al. | 219/243 |
| 3,867,226 | 2/1975 | Guido et al. | 156/229 |
| 4,082,941 | 4/1978 | Sukow et al. | 219/243 |
| 4,212,311 | 7/1980 | del Valle . | |
| 4,213,460 | 7/1980 | Weiner . | |
| 4,247,753 | 1/1981 | Jaronen | 219/201 |
| 4,438,323 | 3/1984 | Milnes | 219/243 |
| 4,561,925 | 12/1985 | Skerjanec | 156/379 |

ELECTRIC HEAT SEALER ENERGIZABLE BY INTERNAL BATTERY SET OR EXTERNAL AC ADAPTER

CROSS-REFERENCE TO RELATED APPLICATION

This application is a continuation-in-part of U.S. Ser. No. 07/508,754, filed Apr. 12, 1990, now abandoned.

BACKGROUND OF THE INVENTION

The present invention relates to electric heat sealers and more particularly to an electric heat sealer which is compact, inexpensive to manufacture and practical in use.

Heat sealers are used for sealing plastic bags or other products. Conventional heat sealers are generally operated by means of AC or DC power. In regular mini-type electric heat sealers DC power is commonly the only choice to provide electric heating elements with the necessary working voltage, and the electric heating are generally connected to the battery by means of conductors. One disadvantage of the conventional mini-type electric heat sealers is that AC and DC power supply cannot be alternatively used. Another disadvantage of the conventional mini-type electric heat sealers is its complicated structure which is expensive to manufacture and assemble.

SUMMARY OF THE INVENTION

The present invention has been accomplished under the circumstances in view. It is an object of the present invention to provide an electric heat sealer which is inexpensive to manufacture and easy to assemble.

Another object of the present invention is to provide an electric heat sealer which can be alternatively operated by means of AC power supply and DC power supply.

To accomplish the above objects, a housing is provided including a cover having a hole formed therethrough. A pair of spaced electrically conductive elements are supported within the housing. These elements can be connected to a set of batteries in the housing to provide DC or can be connected to a source of AC exterior of the housing by means of an adapter which steps down the AC voltage to match the battery voltage and rectifies the low voltage AC to DC. An electrically nonconductive base carries an electric heating wire on the upper part thereof, the opposite ends of the heating wire being connected to electrically conductive side plates mounted on the base. The base is biased upwardly so that the side plates are normally spaced from the conductive elements. The upper part of the base extends through the hole in the cover supported by the housing. Operating means is movably connected to the housing and is movable downwardly to engage an object to be sealed which is supported on the upper part of the base to urge the base downwardly and cause the side plates to engage the conductive elements and heat the heating wire.

BRIEF DESCRIPTION OF THE DRAWINGS

The present invention will now be described by way of example with reference to the annexed drawings, in which.

DESCRIPTION OF THE PREFERRED EMBODIMENTS

Figure 1:
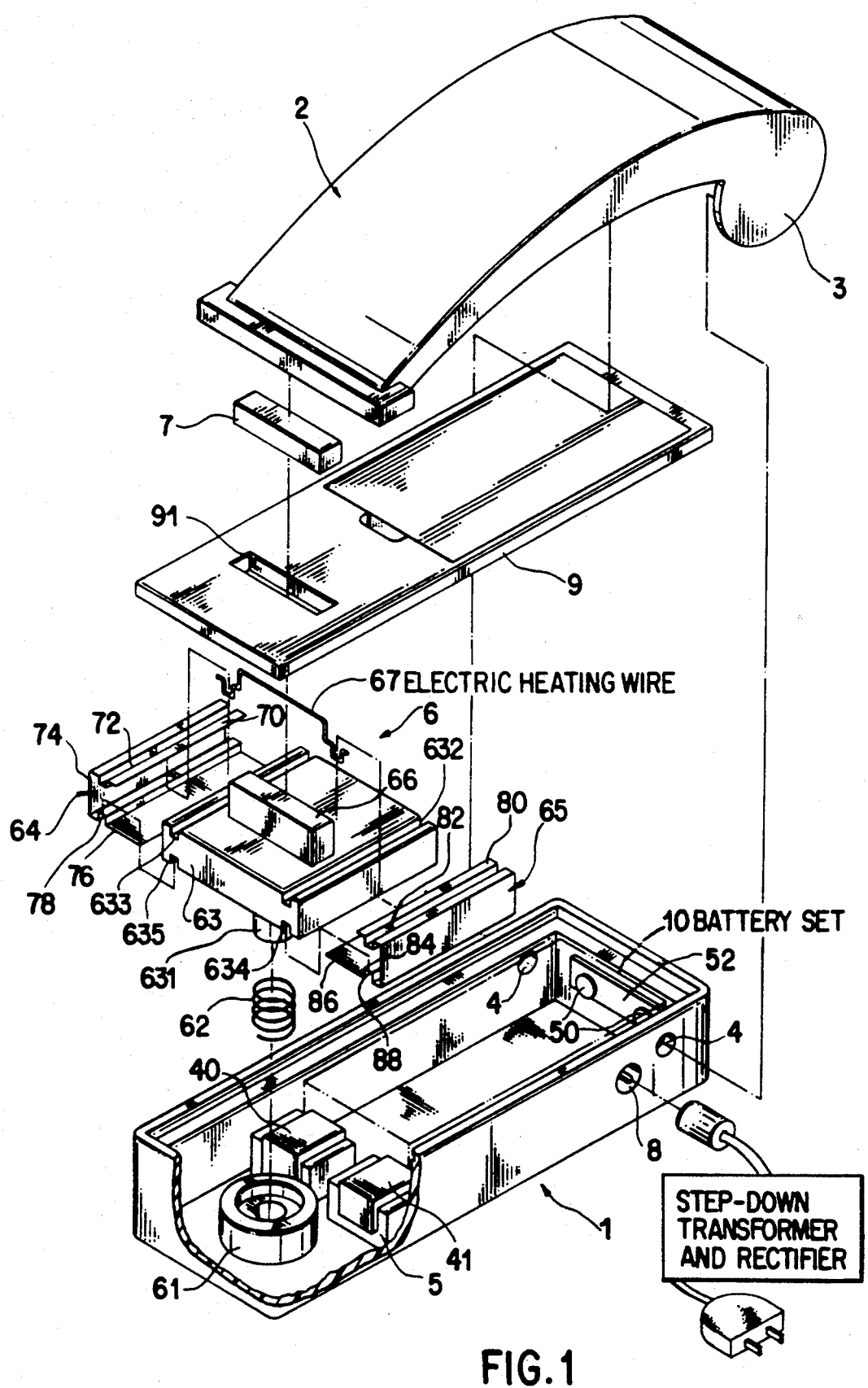
FIG. 1 is a perspective exploded view of the present invention.

Referring to FIG. 1, a heat sealer in accordance with the present invention includes a rectangular housing 1 defining therein an inner chamber for receiving a battery set 10 shown in phantom lines in FIG. 1. Two insulating posts 5 which each have an invertedly disposed U-shaped configuration are mounted on the inner bottom surface of the housing 1. Electrically conductive U-shaped copper plates 40 and 41 are carried by the posts 5 and are directly in contact with the battery set. The copper plates 40 and 41 are electrically connected respectively to the positive and negative terminals of the batteries and serve as a pair of fixed contacts of a switch. The opposite terminals of the batteries engage the two round contacts 50 disposed on a strip 52 of electrically conductive material which is supported on the end wall of housing 1. An unitary ring-shaped support 61 which has a stepped inner wall surface is made inside the rectangular housing 1 in front of the insulating posts 5. A power socket 8 is made on the side wall portion of the rectangular housing 1 for alternatively connecting an external AC power source to the copper plates 40 and 41. The positive and negative terminals of the power socket are disposed inside the housing and are connected to the copper plates 40 and 41 by electrical conductors (not shown). The power socket is connected to AC power through an adaptor which rectifies and drops the voltage to provide a DC voltage of about three volts, similar to the voltage of the batteries comprising battery set 10. The adaptor can include a housing containing a step-down transformer having its input connectable to an external AC power outlet, a rectifier connected in series between the transformer and leads connected to a plug adapted to be inserted into the power socket 8. A compression spring 62 is set inside the ring-shaped support 61. A heat sealing mechanism 6 is mounted on the ring-shaped support 61 with its circular bottom rod 631 inserted through the compression spring 62 into the ring-shaped support 61 (see FIG. 2). The heat sealing mechanism 6 comprises a base 63 having an unitary, rectangular, raised portion 66 transversely made on its top and two elongated grooves 632, 633 bilaterally longitudinally made on its top with two U-shaped side plates 64, 65 which are made of copper material respectively fastened therein to secure an electric heating wire 67 therebetween with the opposite ends of the heating wire electrically connected to plates 64 and 65. The electric heating wire 67 transversely extends over the unitary, rectangular, raised portion 66. Base 63 also includes two elongated grooves 634 and 635 in its bottom surface. Plate 64 includes an upper leg 70 having a U-shaped portion 72 depending therefrom and which is adapted to fit within groove 633. Plate 64 further includes a side leg 74 extending between upper leg 70 and a lower leg 76. Lower leg 76 includes a U-shaped portion 78 extending upwardly therefrom and which is adapted to fit within groove 635.

Plate 65 includes an upper leg 80 having a U-shaped portion 82 depending therefrom and which is adapted to fit within groove 632. Plate 80 further includes a side leg 84 extending between upper leg 80 and the lower leg 86. Lower leg 86 includes a U-shaped portion 88 extending upwardly therefrom and which is adapted to fit within groove 634.

Figure 2:
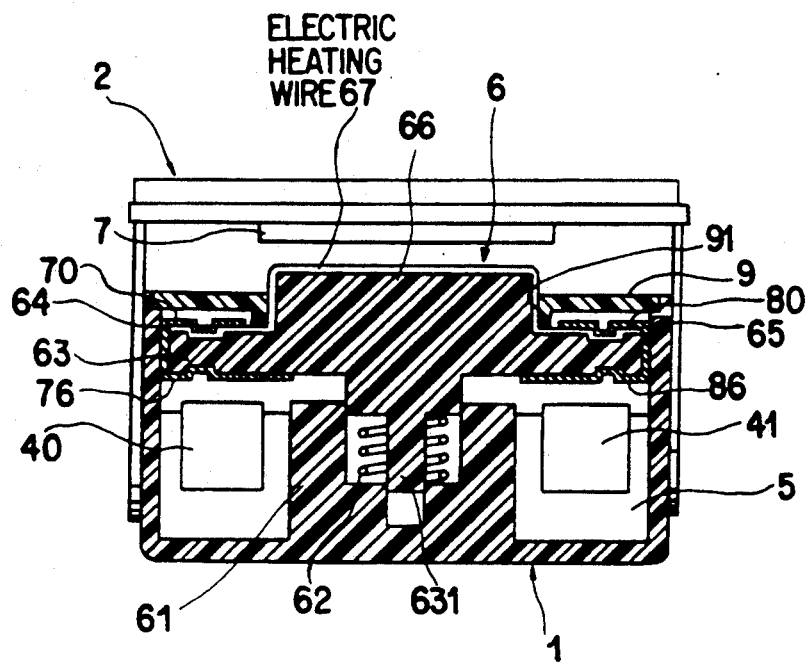
FIG. 2 is a sectional view thereof taken along line 2—2 of FIG. 3.

As seen in FIG. 2, when plates 64 and 65 are in assembled position, the upper legs 70 and 80 of plates 64 and 65 respectively are in electrical contact with opposite ends of the heating wire 67, and the lower legs 76 and 78 are respectively normally spaced from plates 40 and 41 by spring 62. Plates 64 and 65 serve as the movable contacts of a switch and are adapted to engage the fixed contacts 40 and 41 when base 63 is moved downwardly.

Figure 3:
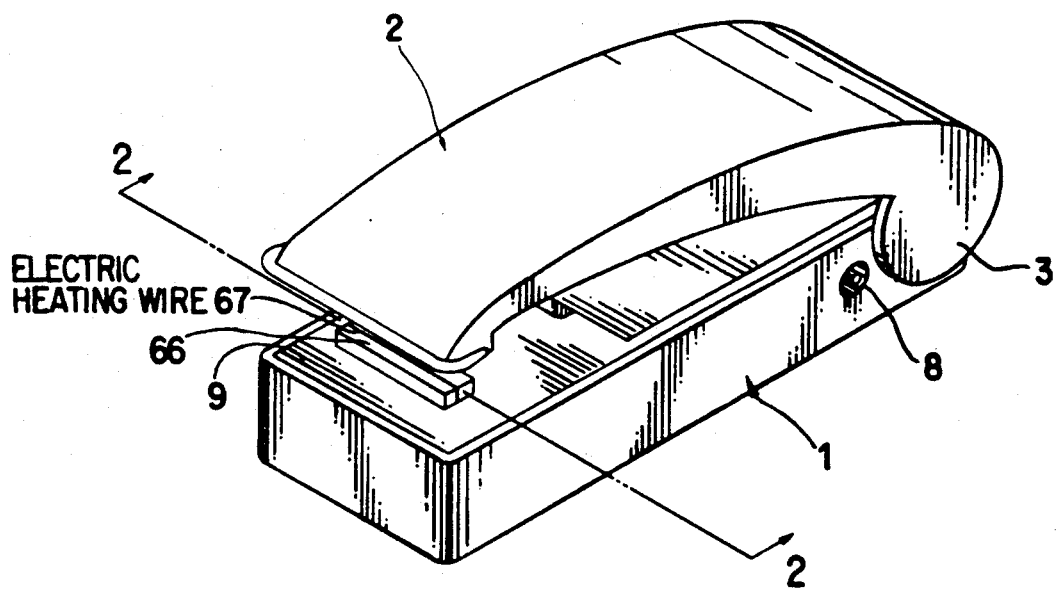
FIG. 3 is a perspective assembly view thereof.

After the heat sealing mechanism 6 is positioned in the ring-shaped support 61 inside the rectangular housing 1, a rectangular cover board 9 which has a rectangular slot 91 corresponding to the raised portion 66 is mounted on the top of the rectangular housing 1 permitting the rectangular, raised portion 66 of the base to protrude beyond its rectangular hole 91. A press bar 2 which has a rectangular heat insulator 7 on its front bottom is pivoted to the rectangular housing 1. Heat insulator 7 can comprise a rubber block covered with a suitable heating insulating material such as Teflon coated wire mesh or the like. The press bar has a pair of spaced depending ears 3 formed at the rear bottom thereof, these ears each having a substantially cylindrical stub rod (not shown) supported thereby and extending inwardly thereof. These rods fit within holes 4 formed in the opposite side walls of the housing as indicated in phantom lines in FIG. 1 to pivotably support bar 2 on the housing. Through the aforesaid arrangement, an electric heat sealer is set up as shown in FIG. 3.

The operation of the present invention is outlined hereinafter. Place the object to be sealed, such as two sheets of a thermoplastic material, on the rectangular cover board 9 between the rectangular, raised portion 66 of the heat sealing mechanism 6 and the rectangular heat insulator 7 of the press bar 2. Then, press the press bar 2 downward permitting the rectangular heat insulator 7 to contact the object to be sealed which is supported on the rectangular raised portion 66. When the raised portion 66 of the heat sealing mechanism 6 is forced by the rectangular heat insulator 7 to move downward, the two side plates 64, 65 immediately contact the two U-shaped cooper plates 40, 41 to conduct electric voltage to the electric heating wire 67 permitting the electric heating wire 67 to produce heating for sealing, and the thermoplastic sheets of the object are immediately sealed by the heat. After sealing, the press bar 2 is released which results in upward movement of the raised portion 66 by the spring 62, so that plates 64, 65 separate from contact with plates 40, 41 to deenergize the heating wire 67 and terminate the heating thereof. Because of compact design, the present electric heat sealer can be conveniently manipulated to change sealing direction.

I claim:

1. An electric heat sealer comprising, a housing, said housing including a cover having a hole formed therethrough, a pair of spaced electrically conductive elements supported within said housing below said hole in said cover, power supply means supported by said housing supplying electrical power to said elements, an electrically nonconductive base mounted with said housing for movement in upward and downward directions relative to the cover, resilient means biasing said base in an upward direction so that an upper part of the base extends through said hole, an electric heating wire carried on the upper face of said upper part of said base and having opposite ends, a pair of electrically conductive side plates mounted on said base and being electrically connected to different ones of said ends of said wire, said side plates having engaging surfaces thereon for electrically engaging different ones of said elements, said engaging surfaces being biased away from said elements by said resilient means to be normally spaced from said elements, and operating means movably connected to said housing externally thereof and above said hole in said cover, said operating means being movable downwardly to engage an object to be sealed which is support on said upper part of the base extending through said hole and urge said base downwardly and cause the engaging surfaces of said side plates to engage said elements to heat said heating wire.

2. An electric heat sealer as defined in claim 1 wherein said operating means comprises a press bar pivotably connected to said housing, and heat insulator means supported by said press bar, said heat insulator means engaging and urging said base means downwardly upon downward movement of said press bar.

3. An electric heat sealer as defined in claim 1 wherein said base has a plurality of grooves formed therein, said side plates including U-shaped portions each of which is received within one of said grooves.

* * * * *